United States Patent [19]

Storck

[11] 4,289,370
[45] Sep. 15, 1981

[54] FLAT CONDUCTOR CABLE ELECTRICAL CONDUCTOR JUNCTION MEANS

[75] Inventor: Glenn E. Storck, Long Valley, N.J.

[73] Assignee: Thomas & Betts Corporation, Raritan, N.J.

[21] Appl. No.: 42,370

[22] Filed: May 25, 1979

[51] Int. Cl.³ ............................................. H02B 1/06
[52] U.S. Cl. ........................... 339/125 R; 339/97 C; 339/176 MF
[58] Field of Search ........... 339/17 F, 176 MR, 99 R, 339/174, 172, 105, 125 R

[56] References Cited

U.S. PATENT DOCUMENTS

| | | | |
|---|---|---|---|
| 2,749,382 | 6/1956 | Lockard | 339/17 F |
| 3,150,909 | 9/1964 | Deverell | 339/17 R X |
| 3,255,429 | 6/1966 | Forney | 339/176 MF X |
| 3,781,767 | 12/1973 | Guthart | 339/125 R |
| 4,088,827 | 5/1978 | Kohaut | 174/48 |

FOREIGN PATENT DOCUMENTS

| | | | |
|---|---|---|---|
| 2513635 | 10/1975 | Fed. Rep. of Germany | 339/176 RF |
| 1222758 | 1/1960 | France | 339/174 |

OTHER PUBLICATIONS

Dilliplane, "A New Concept for Connecting Flat Flexible Cables, Insulation/Circuits", vol. 18, No. 38, pp. 26–29, Jul. 72.

Primary Examiner—Eugene F. Desmond
Attorney, Agent, or Firm—Robert M. Rodrick; Jesse Woldman

[57] ABSTRACT

An electrical connector junction means for flat conductor cable lying along a floor. The electrical connector junction means includes a base having a substantially flat supporting surface for mounting of the base on the floor and having an opening therethrough for receiving through the opening a flat conductor cable when the base is mounted to the floor overlying the flat conductor cable. A support member is secured to the base and includes at least one mounting surface thereon. A fastener is provided for fastening the conductor of the flat conductor cable and a second conductor to the mounting surface. In a preferred embodiment, the second conductor comprises a conventional round conductor wire and the flat conductor cable includes a suitable terminal connector, both of which are sandwiched between the mounting surface and the head of the fastener. A pedestal housing is also provided for the base and the support member and may include means for mounting of a duplex or other suitable electrical device therein and to which the second conductor is connected.

18 Claims, 5 Drawing Figures

FLAT CONDUCTOR CABLE ELECTRICAL CONDUCTOR JUNCTION MEANS

BACKGROUND OF THE INVENTION

The present invention relates to electrical connector junction means and more particularly to electrical connector junction means for use with flat conductor cables lying along a floor.

Flat conductor cable was developed as an alternative to present electrical installation practice utilizing troughs or conduit placed below floor level. The flat cables are intended to be placed flush to the floor surface with the necessary branch circuits leading to the desired locations, and with carpeting then placed over the cable to provide a surface suitable for interior use and for personnel traffic. With such a system, it is necessary to provide electrical receptacles in a suitable housing secured to the floor for termination at each of the desired locations. Coupled with this arrangement is the requirement for providing a suitable electrical/mechanical transition and connection between the flat conductors (which are generally of a thin rectangular cross-section) and the conventional round wire conductors to be used for the electrical receptacles.

In the prior art, flat conductor cable has generally been used for telecommunications equipment and not necessarily in a power distributor system for offices, etc. With telecommunication flat cable, it is generally necessary to use complicated devices or couplings for terminating the flat conductor cable and which are adapted to mate with other suitable coupling devices secured to other conductors, such as for example, conventional round wire conductors which are connected to the telephones and/or other equipment. For example, in U.S. Pat. No. 4,030,801 entitled "Electrical Connector Junction for Carpeted Floor", there are provided mating connectors or couplers for providing a transition from the flat conductor cables of a telecommunication system to the conventional round wire conductor or cable which, in that embodiment, extends to conventional telephone equipment or junction boxes. As can be appreciated, such complicated arrangements necessarily take up a good deal of space, as well as being quite complicated to manufacture and install onto the conductor cable. Further, such arrangements relating to telecommunication systems do not necessarily involve or require the same considerations as are concerned with flat conductor cable for use in power distribution systems. For example, power distribution systems generally function at higher voltage than telecommunication equipment. Also, the number of conductors at each junction is small in a power distribution system compared to the number of conductors at the junctions in telecommunication equipment.

SUMMARY OF THE INVENTION

There is provided in accordance with the present invention electrical connection junction means suitable for use with flat conductor cable lying along a floor. The electrical connector junction means includes a base portion having a substantially flat surface on which the base is to be mounted to the floor and having an opening extending therethrough for receipt of the flat conductor cable when the base is mounted to the floor to overlie the flat conductor cable. A support member is secured to the base portion and spaced above the flat supporting surface. The support member includes at least one mounting surface to which the flat conductor cable is to be connected. There is further provided a fastener for securing the conductor of the flat conductor cable and a second conductor to the mounting surface. In the preferred embodiment, the mounting surface and fastener are adapted to fasten the conductor of the flat cable and the second conductor in electrical contact with one another, and still further the fastener preferably includes a enlarged head portion for sandwiching the conductor of the flat cable and the second conductor between the mounting surface and the enlarged head portion of the fastener.

In another preferred embodiment, a hollow pedestal housing is provided for covering the base and support member. In a further preferred embodiment, the housing is adapted to support a suitable electrical device, such as for example a duplex receptacle, to which the second conductor secured to the mounting surface may be connected. In a still further preferred embodiment, alignment means are provided for aligning the pedestal housing on the support member and base. Such alignment means preferably includes appropriate depending ribs extending from the upper surface of the pedestal housing and including portions adapted to engage respective portions of the base and the support member to properly position the housing relative thereto. The pedestal housing may further include means for securing the housing to the base and support member.

These and other features an characteristics of the present invention will be apparent from the following detailed description in which reference is made to the enclosed drawings which illustrate a preferred embodiment of the present invention.

DETAILED DESCRIPTION OF THE PRESENT INVENTION

Figure 1:
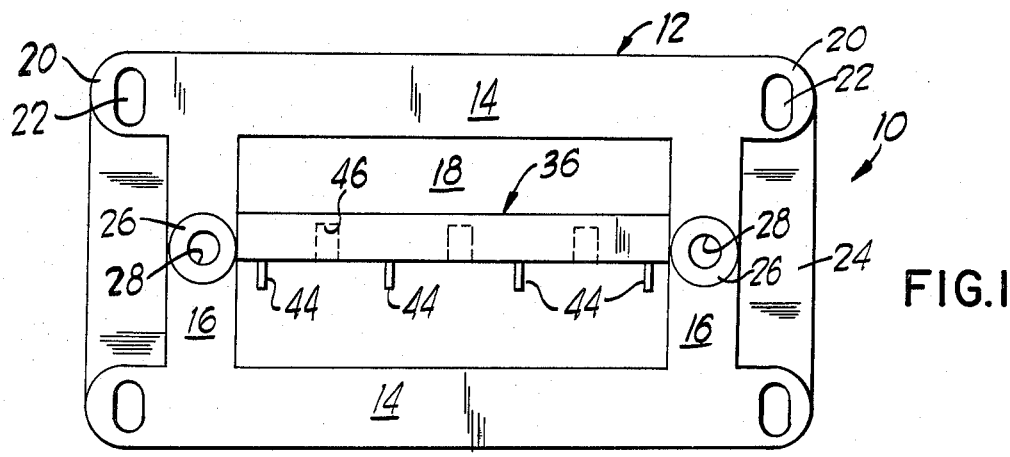
FIG. 1 is a plan view of the electrical connector junction means in accordance with the present invention.
Figure 2:
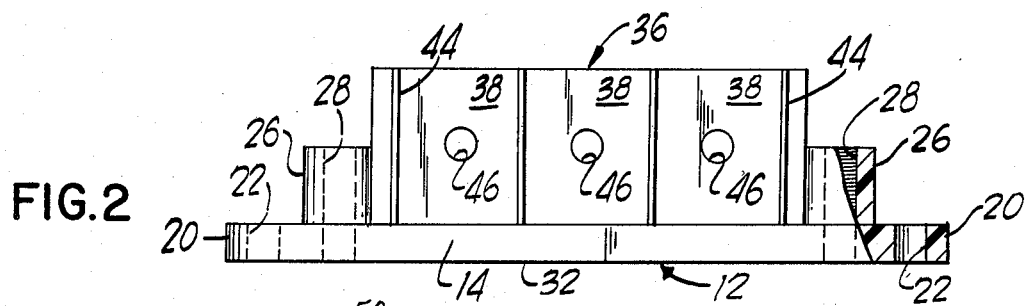
FIG. 2 is a side elevational view of the electrical connector junction means shown in FIG. 1.

Referring now to the drawings in which like reference characters represent like elements, there is shown in FIGS. 1 and 2 an electrical connection junction means 10 in accordance with the present invention which is particularly useful for providing electrical connection for conductors of a flat cable system in which the flat cables are arranged to lie along the floor. The electrical connector junction means 10 includes a substantially flat base portion 12 fabricated preferably of a plastic material suitable for molding. The base 12 includes a pair of spaced, parallel, longitudinally extending arms 14 separated from one another and joined together by a pair of spaced, parallel, laterally extending arms 16 that define an opening 18 of a generally rectangular shape extending therethrough. The ends 20 of the longitudinally extending arms 14 are provided with elongated mounting holes 22 to accept suitable mechanical fasteners for securing the base portion 12 to the floor. Further a web section 24 may be provided extending laterally between the extremities of longitudinally extending arm 14 to provide a suitable gluing surface to provide an alternative method of fastening of the base 12 to the floor if desired.

Two upstanding posts 26 are centrally provided on the laterally extending arms 16 and include a suitable opening 28 therein for receiving a mounting screw for securing the pedestal housing 30 to the base 12, as more fully described hereinbelow.

Figure 3:
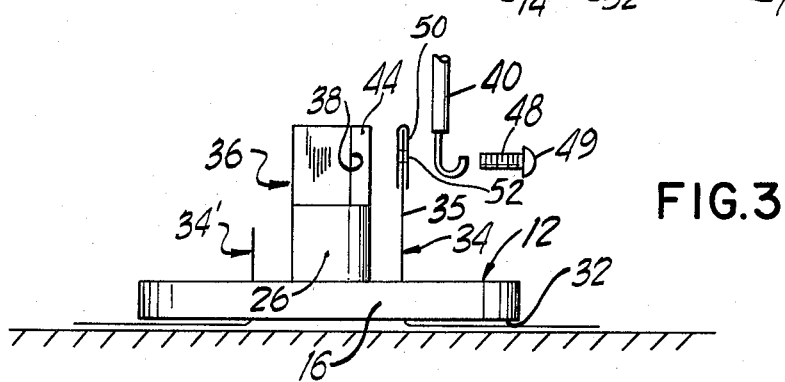
FIG. 3 is a end elevational view of the electrical connector junction means in accordance with the present invention showing how a conductor of flat conductor cable and a round wire conductor are secured to the support member.
Figure 5:
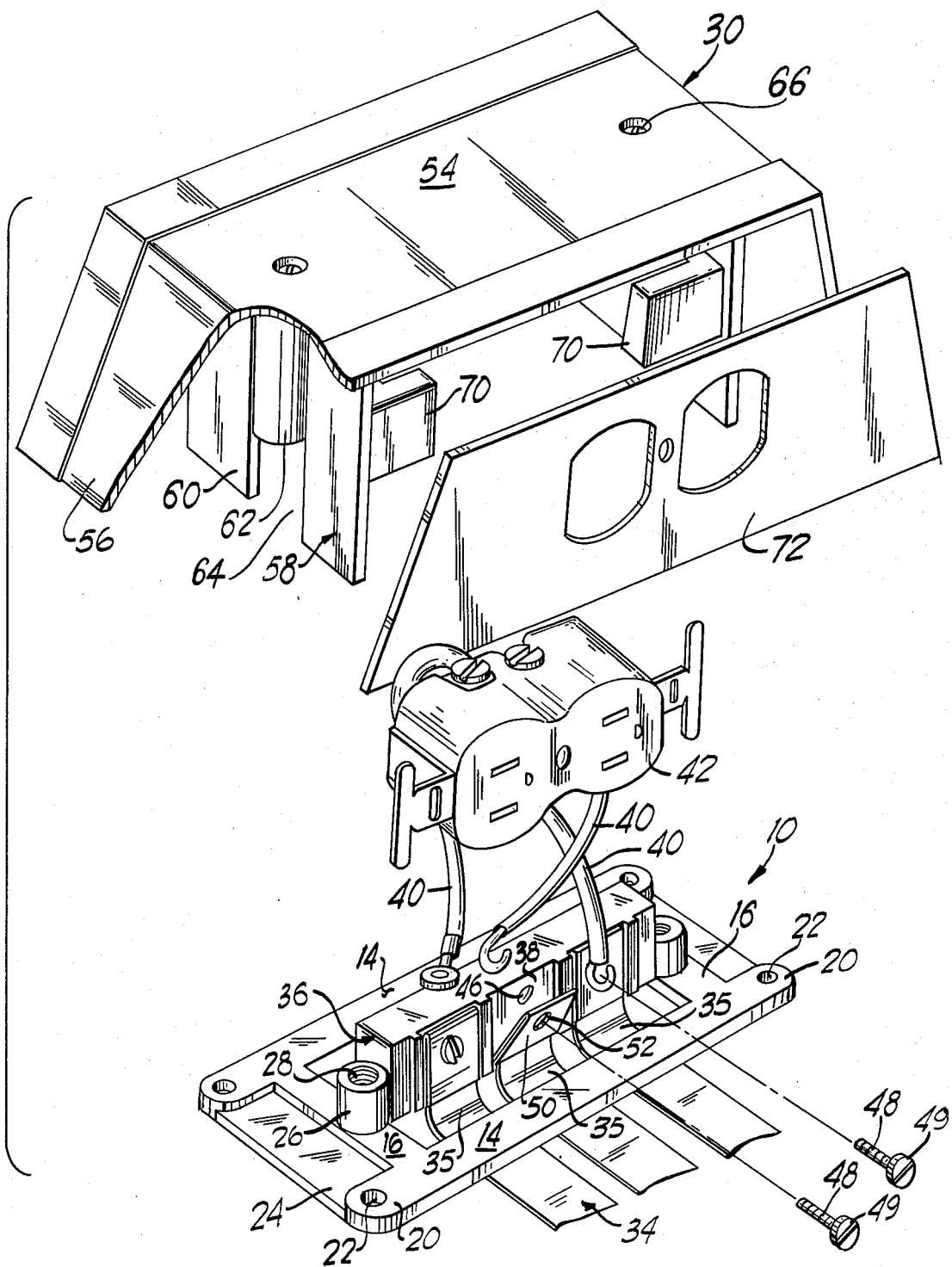
FIG. 5 is an exploded perspective view showing the electrical connector junction means in accordance with the present invention illustrating the connection of conductors of the flat conductor cable with second conductor connected to a suitable duplex receptacle.

The lower surfaces 32 of the longitudinally extending arms 14 are preferably substantially flat for supporting the base portion 12 on the floor. The opening 18 provided between the arms 14, 16 of the base 12 is for passing of the ends of flat conductor cable 34 which may be used for power and/or telecommunication cables. As best seen in FIG. 3, the base 12 is adapted to be supported on the floor to over lie that flat conductor cable 34 with the longitudinally extending arms 14 arranged to sandwich the cable 34 between the floor and the lower support surface 32 of the base 12. This arrangement serves to secure the flat conductor cable 34 in place so that same cannot move with respect to the base 12. This serves to minimize strain on the cable 34 which might otherwise cause damage to the cable 34 or cause the cable 34 to become disconnected from its mounting. As can be seen in FIGS. 3 and 5, the flat conductor cable 34 is generally of rectangular shape and thin so that the base portion 12 can be secured firmly to the floor and so that carpeting may be laid over the cable 34 to provide a smooth surface and one suitable for personnel traffic.

A support member 36 is secured to the base portion 12 to provide a plurality of mounting surfaces 38 for the individual conductors 35 of the flat cable 34 and for providing a transition connection between such conductors 35 of the flat cable 34 and other conductors 40, which for example may include round wires connected to suitable electrical devices 42 (see FIG. 5). In the embodiment shown in the figures, the support member comprises a rib 36 integrally formed with the base portion 12 and extending between the two upstanding posts 26 on the lateral arms 16 of the base portion 12. However, as can appreciated, the base portion 12 and the support member 36 could comprise separate components which are fitted together. For example, the support member could comprise a separate rectangular shaped member having a central longitudinally extending upstanding rib, and in which the rectangular portion being adapted to overlie the longitudinal and lateral arms of the base portion.

The longitudinally extending support member rib 36 extends upwardly above the longitudinally and laterally extending arms 14, 16 of the base 12 and includes, on one side thereof, a plurality of mounting surfaces 38 each separated from one another by laterally extending ribs 44. The ribs 44 are separated from one another a distance which substantially corresponds to the width of the conductors 35 of the flat conductor cable 34. In the embodiment shown, the flat conductor cable 34 includes three conductors 35 suitably connected to a source of power and thus, three mounting surfaces 38 are provided on the support member 36.

The mounting surfaces 38 each include a centrally located threaded bore 46 adapted to receive a machine screw or other threaded member 48 for securing the conductors 35 of the flat conductor cable 34 and respective second conductors 40 in electrical contact with another to the mounting surfaces 38. For this purpose, each of the conductors 35 of the flat conductor cable 34 is provided with a suitable transition or terminal connector 50 which serves to pierce through the insulation surrounding the conductor 35 and make electrical contact with the conductor 35. For example, the transition or terminal connector 50 may be of a type which is the subject of commonly owned copending U.S. Ser. No. 06/042,356, filed on even date herewith, and entitled "Termination Connector". However, another type of suitable transition connector could be provided. The transition connector 50, which has portions on both sides of the conductor 35 of the flat cable 34, preferably includes an opening 52 extending therethrough and through the conductor 35. The machine screw or other fastener 48 is adapted to pass through this opening 52 for securing the transition connector 50 and a second conductor 40 to the mounting surface 38 with the transition connector 50 and the second conductor 40 in electrical contact with one another.

By virtue of the mounting surfaces 38 on the upstanding rib 36, each of the conductors 35 of the flat conductor cable 34 and a respective second conductor 40 for electrical connection therewith may be secured and supported in electrical contact between its respective mounting surface 38 and the enlarged head 49 of its respective threaded fastener 48. As best seen in FIG. 3, the second conductor 40 for electrical connection with one conductor 35 of the flat cable 34 may comprise a round wire which has had the insulation at the end thereof removed and which has been bent in a conventional manner so that it may be secured by the threaded fastener 48. The threaded fastener 48 exerts pressure on the round wire conductor 40 and the transition connector 50 on the flat cable 34 which is sufficiently high to provide good electrical connection therebetween. It will be appreciated that this is a much simpler arrangement than the prior art arrangements providing separate coupling housings on each of the ends of the respective conductors which are then mated together.

It should be noted that although the second conductor 40 for electrical connection with the flat conductor 35 of the cable 34 running along the floor is shown as a round wire, it is of course to be realized that a flat conductor can also be used. Further, it should be realized that additional conductors could be secured to the same mounting surface 38 in electrical contact with the flat conductor 35 and the second conductor 40, as is conventional with standard junction box for round wire conductors.

As shown in FIG. 3, a second flat conductor cable 34' also extends under the base portion 12 and upwardly through the central opening 18 therein. This conductor cable 34' may be for additional power distribution circuits and/or for telecommunication devices. In the embodiment shown in FIG. 3, this additional cable 34' is intended for telecommunication purposes and is adapted to be connected in a suitable manner to such telecommunication devices (not shown). In this regard, additional mounting surfaces could be provided on the opposite longitudinal side of the support member 36 for this purpose.

Figure 4:
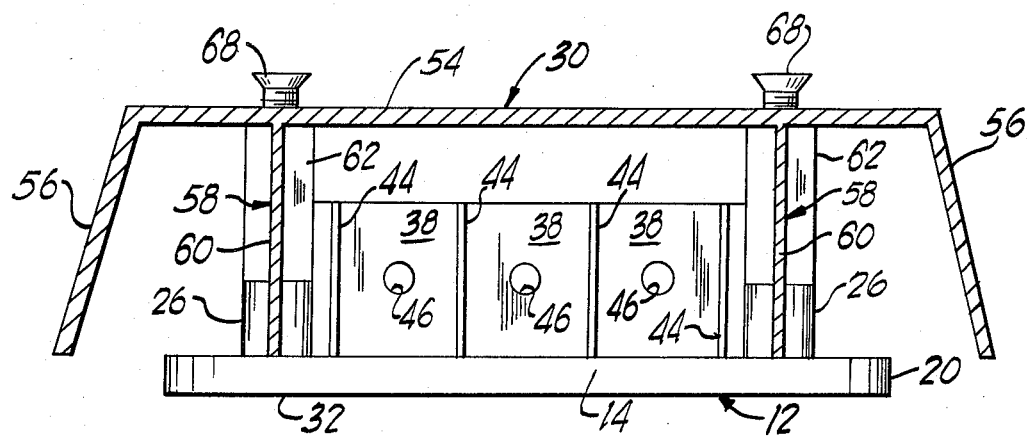
FIG. 4 is a side elevational view, partly in section, showing the electrical connector junction means, and including a pedestal housing in an assembled and installed position.

The electrical connection junction means 10 in accordance with the present invention may also be provided with a pedestal housing 30 for covering the cables 34, 34' and mounting surfaces 38 therein in order to provide an enclosed housing in which electrical connections are made, in accordance with standard electrical code requirements. For this purpose, the housing 30 includes a substantially flat upper plate 54 having a pair of end plates 56 depending downwardly from the ends thereof and inclined slightly outward. A pair of rib structures 58 also depend downwardly from the flat upper plate 54 between the two end plates 56 (see FIGS. 4 and 5). These rib structures 58 each include a downwardly depending relatively thin rib 60 extending substantially completely across the width or lateral dimension of the housing 30 and a central enlarged section 62 extending transversely on opposite sides thereof. The thin ribs 60 extending across the width of the housing 30 are each provided with a recessed portion 64 at its lower end so that it fits over the upstanding post 26 on the laterally extending arm 16 of the base portion 12. This recess 64 is sized to fit exactly over the posts 26 to serve to center the housing 30 laterally relative to the base 12 and the support member 36. The central enlarged sections 62 on each rib 58 are adapted to engage the upper ends of the support member 36 to center the housing 30 longitudinally relative to the base 12 and the support member 36 when the housing 30 is positioned thereover. The central enlarged sections 62 are each provided with a bore 66 therethrough in alignment with the hole 28 in the upstanding post 26 on the base 12 for securing the pedestal housing 30 to the base 12 by means of screws 68. Further, the thin ribs 60 may also be provided with mounting blocks 70 for suitable electrical receptacles 42 (see FIG. 5).

Installation of the electrical connection junction means 10 in accordance with the present invention begins by placing the base portion 12 on the floor over flat conductor cable 34 for power distribution and/or telecommunication equipment which has been laid on the floor in a desired manner to provide the necessary branch circuits. Such cable 34 and arrangement for example is shown in commonly owned copending application Ser. No. 06/042,709, filed on even date herewith, and entitled "Flat Cable and Installing Method". The base portion 12 is then fastened to the floor, either by gluing with the use of the gluing surfaces 24 or by means of mechanical fasteners inserted through the holes 22 at the extremities 20 of the longitudinal arm sections 14. Sufficient cable 34 is then fed through the opening 18 in the base portion 12 on either side of the centrally located support member 36 to provide for termination and electrical connection. For the power distribution cable 34, the cable 34 is cut to lengths for installation of a suitable transition or terminal connector 50 on the end thereof, such as for example the transition connector of the aforementioned U.S. copending Application Ser. No. 06/042,356.

A suitable threaded fastener 48 is placed through the central opening 52 of the transition or terminal connector 50 and into the mounting hole 46 in the respective mounting surface 38. A round conductor wire 40 is then prepared by removing insulation from the end and bending the wire 40, and placed under the head 40 of the screw fastener 48 which is then tightened securely to provide for electrical connection between the round wire 40 and the flat conductor 35. As noted above, the three mounting surfaces 38 on the support member 36 provide for the electrical connection of the three separate electrical conductor lines utilized to provide power at any particular location. For conventional 110–120 v. circuits, one of the mounting surfaces is for the "hot" conductor, one for the neutral wire and one for the ground, whereas for conventional 220–240 systems, two of the terminals are for "hot" wires and the other for the neutral or ground conductor.

After the conductors 35 of the flat conductor cable 34 and the respective second conductors 40 have been secured in place in electrical contact, the housing 30 is then placed over the base 12 and centered on the base 12 by means of the alignment rib structures 58. Screws 68 are then passed through the holes 66 provided in the pedestal housing 30 and engaged in the opening 28 provided in the posts 26. Suitable electrical devices such as for example duplex receptacles 42 may then be connected to the ends of the round conductors 40, and then receptacles 42 then mounted to the housing 30 in the space provided, such as for example to blocks 70 extending from the ribs 60 (see FIG. 5). A cover plate 72 may then be secured to the receptacle 42, in a conventional manner, to complete closure of the housing 30.

It should be noted that the base 12 may be of any convenient size to accommodate varied numbers of conductors 35 by adding or subtracting from the length of the support member 36. Further, the mounting holes 22 for the base portion 12 may be varied in location and configuration. Still further, the support member 36 may be provided with a slot for the flat cable transition connector 50 to slip into with a corresponding hole provided in the top or side thereof to accept the round conductor 40. Again, a threaded fastener would be utilized to bring into intimate contact the flat conductor connector 50 and the round wire 40.

Thus, it is seen that with use of the arrangement in accordance with the present invention, sufficient pressure may be applied to provide for good and secure electrical contact between the flat conductor transition connector 50 and the round conductor cable 48 by utilizing simple machine screws 48 mounted into holes 46 provided in the mounting surfaces 38 for sandwiching and securing the connector 50 (and thus the flat conductor 35) and the round wire 40 between the mounting surface 58 and the screw 48. It should be further realized that with the design in accordance with the present invention, it is not necessary to provide an electrical bus bar which is normally utilized between two connection points having similar electrical potential. This results from the fact that the flat conductor cable transition connector 50 acts as a bearing surface for the round conductor cable 40 sandwiched between the connector 50 and the mounting screw head 49, thus providing for a simpler and more economically produced design.

Further, it is to be noted that the arrangement of the base 12 having the arms 14 overlying the flat conductor cable 34 having a central opening 18 through which the cable 34 extends upwardly, provides for strain relief on the flat cable 34 since the cable 34 is sandwiched between the base 12 and the floor.

While the preferred embodiment of the present invention has been shown and described, it will be understood that such are merely illustrative and that changes may be made without departing from the scope of the invention as claimed.

What is claimed is:

1. Electrical connector junction means for use with flat conductor cable of the type including outer insulation and a conductor therewithin, said cable adapted to lie along a floor, said electrical connector junction means comprising:
   a base having a substantially flat support surface for mounting of said base on a floor and having an opening therethrough for receiving through the opening a flat conductor cable lying on the floor when said base is mounted on the floor over the flat conductor cable;
   a conductor termination for making electrical contact with a conductor through the outer insulation of said cable, said conductor termination having an insulation piercing portion adjacent each side of said cable, each portion having a fastener receiving opening therethrough;
   a support member secured to said base and extending above said support surface, said support member including at least one mounting surface for a terminated conductor of the flat conductor cable extending through said opening in said base; and
   a fastener extending through said openings in said conductor termination portions for fastening said conductor termination and a second conductor to said mounting surface to thereby establish electrical connection between said conductor of the flat cable and said second conductor.

2. The electrical connector junction means of claim 1 wherein said mounting surface includes a threaded bore therein and wherein said fastener is externally threaded for being received in said bore in said mounting surface.

3. The electrical connector junction means of claim 1 wherein said support member includes three mounting surfaces for three conductor terminations on said cable extending through said opening in said base and three fasteners for separately fastening the terminations on the flat cable with respective second conductors to said mounting surfaces.

4. The electrical connector junction means of claim 3 further including means for electrically insulating the three terminations on the flat conductor cable from one another.

5. The electrical connector junction means of claim 4 wherein said means for insulating comprises ribs projecting outwardly away from said mounting surfaces.

6. The electrical connector junction means of claim 1 further including a housing for said base and said support member, said housing including means for aligning said housing relative to said base and said support member.

7. The electrical connector junction means of claim 6 wherein said alignment means comprises a plurality of ribs for centering said housing both laterally with respect to said support member and longitudinally with respect to said support member.

8. The electrical connector junction means of claim 7 wherein said housing includes an upper surface and a pair of spaced end surfaces depending therefrom and wherein said ribs depend from said upper surface between said end surfaces, said depending ribs including first rib portions for centering said housing longitudinally with respect to said support member by engaging the longitudinal ends of said support member and a second rib portion for centering said housing laterally with respect to said support member.

9. The electrical connector junction means of claim 8 further including means for fastening said housing to said base member.

10. The electrical connector junction means of claim 6 wherein said housing includes means for mounting duplex receptacles therein.

11. The electrical connector junction means of claim 1 wherein said base includes a pair of parallel spaced longitudinally extending arms and a pair of spaced parallel laterally extending arms extending between and interconnecting said longitudinally extending arms; wherein said opening in said base is defined between said pair of longitudinally extending arms and said pair of laterally extending arms; and wherein said support member extends longitudinally above said opening and parallel to said longitudinally extending arms, the flat conductor cable being adapted to pass beneath one of said longitudinally extending arms of said base through said opening for connection to said support member.

12. The electrical connector junction means of claim 1 wherein said base includes means for attaching said base to said floor.

13. The electrical connector junction means of claim 12 wherein said means for attaching said base to the floor comprises a gluing surface on said base.

14. The electrical connector junction means of claim 12 wherein said means for attaching said base to the floor comprises openings through said base for receiving fasteners for fastening said base to the floor.

15. In combination, a flat conductor cable adapted to lie along a floor and having a first plurality of conductors surrounded by insulation; a second series of associated conductors for said conductors of said flat conductor cable, and electrical connector junction means for said conductors of said flat conductor cable and of said second series, said electrical connector junction means comprising:
   a base mounted on the floor over the flat conductor cable, said base including a flat surface for engaging said flat conductor cable ans sandwiching said flat conductor cable between said flat surface and the floor, and said base including an opening therethrough for receiving said flat conductor cable;
   a plurality of conductor terminations, each termination making electrical contact with a respective conductor of said flat cable through the surrounding insulation, each termination having an insulation piercing portion adjacent each side of the insulation surrounding the respective conductors, each portion having a fastener receiving opening therethrough;
   a support member secured to said base and extending above said flat surface, said support member including at least one mounting surface for each conductor termination; and
   a fastener for each of said mounting surfaces extending through said openings in said conductor termination portions for fastening one of said conductor terminations and at least one conductor of said second series of conductors to said mounting surface establishing thereby electrical connection between respective conductors of said flat cable and said second series.

16. The combination of claim 15 wherein said second conductors comprise round conductor wire.

17. The combination of claim 16 wherein said second conductors are electrically connected to an electrical receptacle.

18. The combination of claim 17 further including a housing connected to said base, said housing including means for mounting said electrical receptacle thereto.

* * * * *